(12) United States Patent
Murakami

(10) Patent No.: US 6,631,544 B2
(45) Date of Patent: Oct. 14, 2003

(54) METHOD FOR INSTALLING END MEMBER TO HOLLOW SHAFT MEMBER

(76) Inventor: Yukiyoshi Murakami, 20-15, Minamihoncho 2-chome, Urawa-shi, Saitama-ken, 336-0018 (JP)

( * ) Notice: Subject to any disclaimer, the term of this patent is extended or adjusted under 35 U.S.C. 154(b) by 0 days.

(21) Appl. No.: 09/681,805

(22) Filed: Jun. 8, 2001

(65) Prior Publication Data

US 2002/0124379 A1 Sep. 12, 2002

(30) Foreign Application Priority Data

Dec. 28, 2000 (JP) .................................... 2000-402963
May 10, 2001 (JP) .................................... 2001-139506

(51) Int. Cl.$^7$ ............................................... B23P 11/00
(52) U.S. Cl. .......................... 29/506; 29/508; 29/516; 29/517; 29/895.2; 72/370.04
(58) Field of Search ...................... 29/452, 465, 506, 29/508, 515, 516, 517, 520, 521, 895.2, 895.21; 72/370.04, 370.05, 370.21, 370.23; 403/274, 278, 279; 492/57, 58

(56) References Cited

U.S. PATENT DOCUMENTS

| 3,792,603 A | * | 2/1974 | Orain | 29/517 |
| 4,067,224 A | * | 1/1978 | Birks | 29/517 |
| 4,072,041 A | * | 2/1978 | Hoffman et al. | 29/517 |
| 5,411,521 A | * | 5/1995 | Putnam et al. | 29/505 |
| 5,606,790 A | * | 3/1997 | Laue | 29/517 |

FOREIGN PATENT DOCUMENTS

| DE | 2920899 A | * | 1/1981 | |
| JP | 356033137 A | * | 4/1981 | 29/505 |
| TW | 211530 A | * | 4/1993 | |

* cited by examiner

Primary Examiner—Gregory Vidovich
Assistant Examiner—Jermie E. Cozart

(57) ABSTRACT

To develop a method for installing an end member to a hollow shaft member for an office equipment in which a high degree of coaxiality and a high degree of vertical state can be attained, its manufacturing stages are simple and they can be realized under a less-expensive cost. The present invention is constituted by the steps comprising (1) using a hollow shaft member made of soft metal; (2) inserting the end member made of hard metal formed with a fitting groove satisfying some requirements into the hollow shaft; (3) forming round holes at the central part of each of the split dies and preparing a molding machine having more than three pressing members toward the center of each of the round holes; and (4) installing the end member to the shaft member with the pressing force of the pressing member.

5 Claims, 7 Drawing Sheets

METHOD FOR INSTALLING END MEMBER TO HOLLOW SHAFT MEMBER

BACKGROUND OF INVENTION

This invention relates to a method for installing an end member into a hollow shaft member for an office equipment, and more particularly a method for installing an end member into a hollow shaft member having sheet feeding rollers or sheet pressing rollers of these devices in regard to the office equipment such as a printer for computer, a copying machine, a word processor and a facsimile machine and the like; an automation teller machine (hereinafter referred to as the "ATM") used in a financial organ, office instruments such as an electrical calculating machines and measuring instruments.

In the prior art, although a shaft member for installing sheet feeding rollers or sheet pressing rollers and the like, for example, is used in the aforesaid business instrument or the ATM, electric calculating machines and measuring instrument and the like, it is general that as the shaft member, a solid member is used.

However, such a solid member had some disadvantages that not only its weight became heavy, but also its manufacturing process became quite complicated and a product cost became high.

Further, in the case that the shaft member was provided with members such as sheet feeding rollers or sheet pressing rollers, the sheet feeding rollers and the shaft member had to be provided with fitting female threads, male threads had to be threadably engaged with and connected to the female threads, and an accurate positioning of these members was required, resulting in that its manufacturing stage was complicated.

In view of the foregoing, the present applicant made a proposal to use the hollow shaft for eliminating these problems. However, in order to fill the hollow part, the end section has to be provided with a solid end member (refer to FIG. 8).

As its installing method in the prior art, the worker had selected only the following methods, i.e. (1) an inner diameter of an aluminum pipe was machined by a lathe to such a size as one in which it could be press-fitted and the pressing member was press-fitted with a precision in press-fitting being increased; (2) or in the case that a high press-fitting strength was needed, adhesive agent was applied to it; or (3) parallel pins or the like were driven in vertical holes formed in the pipe and the end member, or (4) a welding by a frictional pressure welding process was applied to connect these members.

However, in such a method as above, even if the hard end member was press-fitted to the cylindrical aluminum pipe, its precision degree was hardly attained due to soft characteristic of the aluminum pipe and a degree of coaxiality setting the position of the axial center was hardly set in an accurate manner. Further, if the precision was tried to be set, it had to pass through the troublesome and high cost processing step.

Further, the processes such as press-fitting or frictional pressure welding and the like required high energy, their devices were expensive and their energy consumption was severe.

SUMMARY OF INVENTION

The present invention has been invented to eliminate such disadvantages as above and it is an object of the present invention to develop a method in which both a high degree of coaxiality and a high degree of vertical state can be attained, their steps are simple and they can be realized by a less-expensive cost.

A method for installing an end member into a hollow shaft member comprising the steps of:

(1) using a cylindrical hollow shaft member made of soft metal;

(2) inserting a column-like end member made of hard metal which can be inserted into the hollow shaft member in close contacted state and is formed with a fitting groove satisfying the following requirements (a) to (c), (a) that the groove is formed at a predetermined position spaced apart from the terminal end of the end member such that the groove may be present along the outer circumferential surface of the end member and become coaxial with an axis of the end member;

(b) that the depth of the groove is set to a suitable depth in which at least an anchoring effect caused by driving action can be attained, the shaft member can reach the bottom surface through driving action and a coaxiality can be attained with a resistance force; and (c) that the bottom surface of the groove has a sufficient finished precision for attaining a required degree of coaxiality; and (3) preparing a molding machine having a round hole with a hole diameter not to expand an outer shape of the shaft member in an outward direction at the central part of split dies when a resistance force is generated inside by a pressing member and having at least three pressing members arranged slidably toward the center of the round hole; and (4) installing the shaft member and the end member in the dies of said molding machine, moving the pressing members toward the center of the round hole, deforming in plastic manner the shaft member with the pressing force of the pressing members toward the fitting groove of the end member to install the end member into the shaft member.

In accordance with the aforesaid configuration, the present invention can provide the following superior effects.

(1) that a plastic deformation of the shaft member into the fitting groove of the end member can be fed by the pressing members to enable a strong anchoring effect to be attained and the deformation is made uniform with relative resistance forces in three directions or more, resulting in that the end member can be fixed to the central position and a high degree of coaxiality can be realized;

(2) that the degree of coaxiality can be realized in high precision due to the fact that a precision in size is determined by the bottom surface of the fitting groove of the end member made of hard material and the inner wall surface of the round hole; and (3) that a precision is required only at the bottom surface of the fitting groove of the end member of which minute precise machining can be carried out, no precision is required into the shaft member and the like, the end member can be easily installed into the shaft member through a pressing work by the molding die, resulting in that a labor saving can be realized and concurrently it can be manufactured with its cost being less expensive.

(4) In the case of manufacturing the shaft member, it is possible to eliminate a last drawing work with a die formed with a circular hole therein and in particular when two or more rows of the fitting grooves are set in the end member, its remarkable effect can be attained and a substantial labor saving can be provided.

BRIEF DESCRIPTION OF DRAWINGS

The aforesaid and other objects and features of the present invention will become more apparent from the following detailed description and the accompanying drawings.

FIGS. 6A, 6B and 6C are sectional view with a part being enlarged to show a state in which a pressing member presses against the shaft member of the present invention, wherein FIG. 6A shows before pressing, FIG. 6B shows during pressing and FIG. 6C shows completion of pressing.

DETAILED DESCRIPTION

Figure 9:
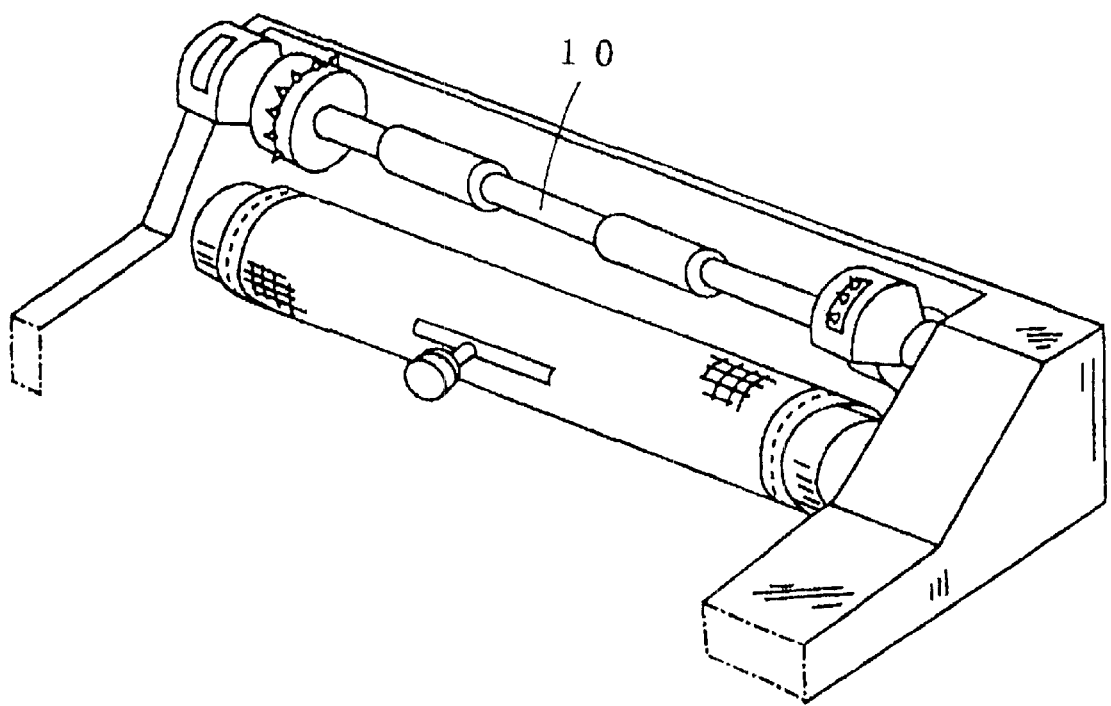
FIG. 9 is a perspective view for showing an office equipment in which the shaft member of the present invention is installed.

A shaft member 10 to which the present invention is directed is mainly used for business machines such as a printer for computer, a copying machine, a word processor and a facsimile machine, and office equipment such as an ATM used in financial organs, an electrical calculation equipment, measuring instruments and the like, and this shaft member 10 is defined as a shaft member used in these machines or the like (refer to FIG. 9).

Figure 8:
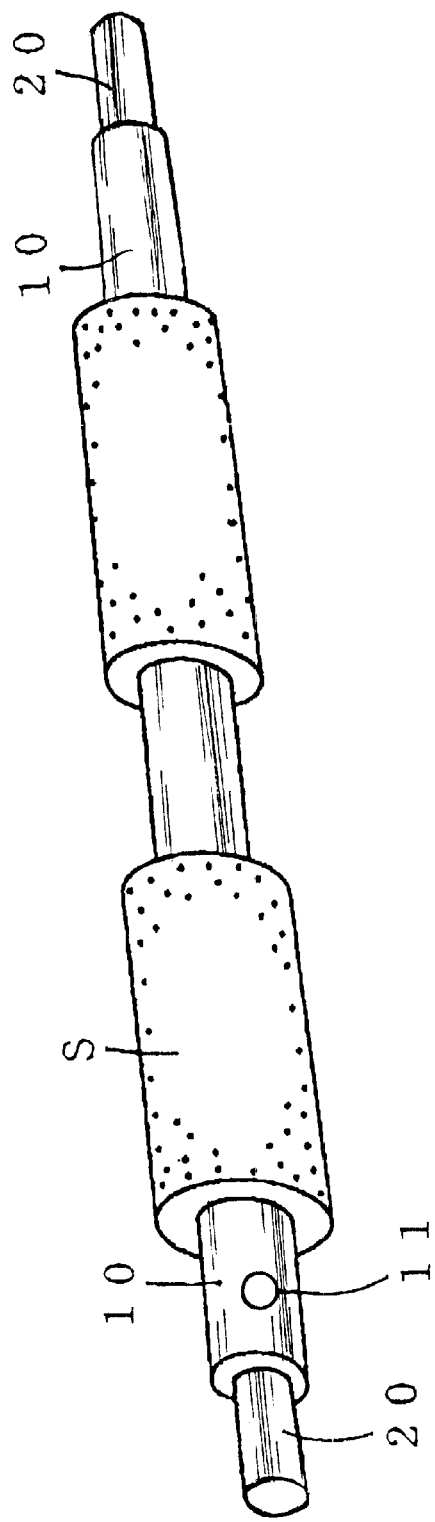
FIG. 8 is a perspective view for showing the shaft member of the present invention on which rubber rollers are installed.

More practically, there occurs sometimes a case in which a sheet feeding roller or a sheet pressing roller is installed at a middle predetermined position, and so the shaft member of the present invention is defined as a shaft member provided with a function member S such as a sheet feeding roller and a sheet pressing roller or the like (refer to FIG. 8).

The shaft member 10 is made of soft metal such as aluminum, brass, copper and soft iron or the like. The shaft member made of soft metallic material is formed into a hollow cylindrical shape having a circular section.

Its manufacturing method is carried out such that a flat plate-like soft metal is applied to forming rollers to be gradually formed into a cylindrical shape, for example, and lastly is drawn out through a die with a circular hole.

However, this manufacturing method for the shaft member is not restricted to the aforesaid method.

In this case, the present invention does not require any specific high precision in regard to a size of inner diameter of the shaft member and its finished state.

Figure 1:
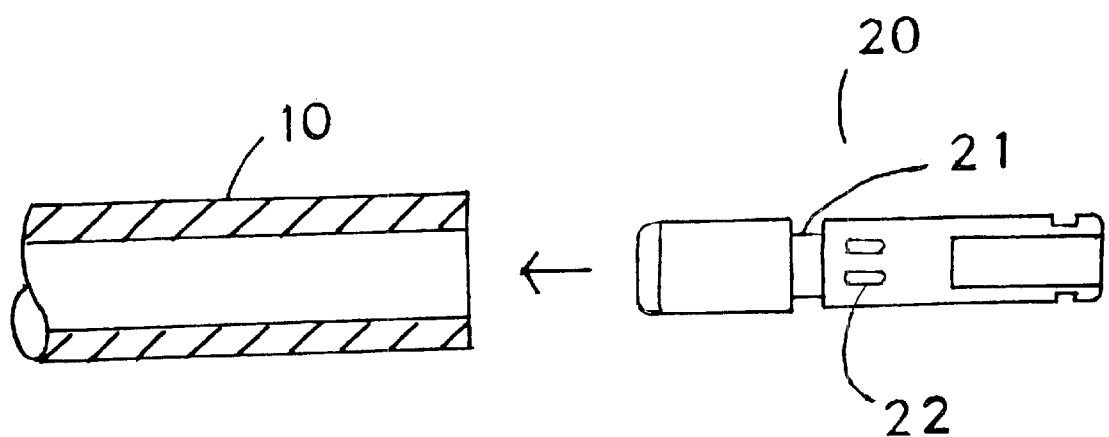
FIG. 1 is a sectional view with a part being broken away to show a shaft member and an end member of the present invention.
Figure 2:
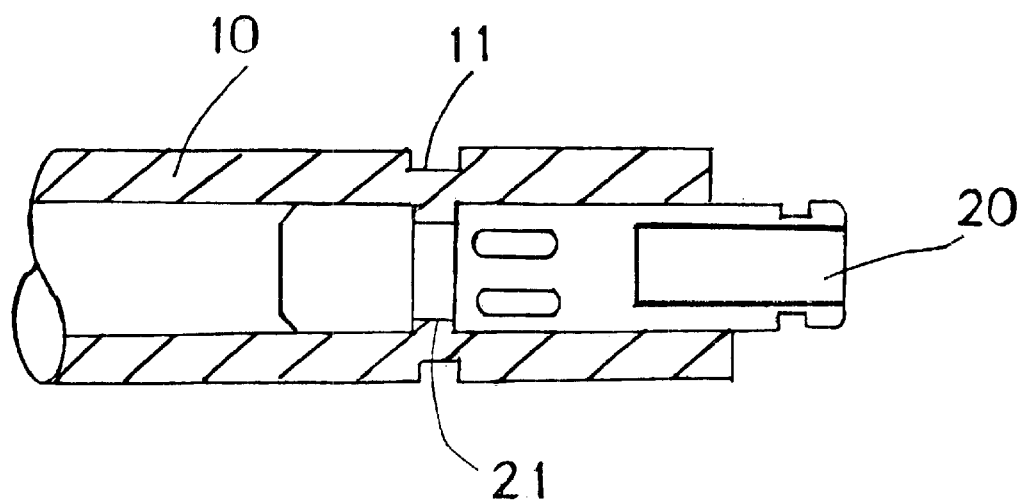
FIG. 2 is a sectional view with a part being broken away to show a state in which the end member is fitted to the shaft member of the present invention.

In turn, an end member 20 to be installed into the aforesaid hollow shaft member 10 is shown in FIGS. 1 and 2, and made of hard metallic material such as steel (SUS-304, etc.) and formed into a column-like solid member.

Then, in the case of the present invention, the end member is formed with a fitting groove 21 satisfying the following requirements.

The requirements to be satisfied by the fitting groove 21 are:

(1) that the fitting groove 21 is formed at a predetermined position spaced apart by a certain distance from a terminal end section of the end member. The predetermined position is defined by a position which is coincided with a driving position by the pressing member in respect to the driving stage performed by the molding die to be described later. More practically, in the case of 8Ø(inner diameter)×50 mm, this position is set at a position which is spaced apart by 15 mm from the terminal end;

(2) that the fitting groove 21 is a circumferential groove which is formed along a circumferential edge of the column-like end member 10 and is coaxial with an axis of the end member; and (3) that a depth of the fitting groove 21 must be such a depth as one in which at least an anchoring effect caused by the driving operation can be sufficiently attained, concurrently the shaft member can reach the bottom surface of the fitting groove with the driving operation and a certain degree of coaxiality can be provided by its resistance force.

Although a depth where the shaft member can reach with the pressing member may be influenced by material quality of the shaft member, its thickness and a width of the groove, it is desirable that the depth is less than thickness of the shaft member.

More practically, for example, in the case that its thickness is 1.0 mm and an outer diameter of 10Ø(inner diameter of 8Ø)×50 mm is set, it is assumed that its depth is 0.5 mm.

(4) that a finished precision at the bottom surface of the fitting groove is sufficiently high. Because, a factor for determining a degree of coaxiality to be described later consists in precision of an outer wall surface of the molding die and precision at the bottom surface of the fitting groove, increased precision enables the degree of finished coaxiality to be increased.

In addition, some wedge-like anti-rotating protrusions 22 can be formed near the fitting groove 21 of the end member 20 in a radial direction perpendicular to the end member. As its practical means, there is provided a method, for example, that the ridges are formed under deformation of their staking process and the ridges can be applied as protrusions.

Further, it is possible that a longitudinal groove for use in releasing air is formed at the inner wall surface of the shaft member and it is satisfactory that a fine groove may be formed along a longitudinal direction not to apply any influence against a physical strength of the shaft member.

Then, in the case that the end member 20 is installed into the shaft member 10, a frame device 30 is used. The frame device 30 is set such that a supporting block 31 is mounted on the base block, a rubber block 33 is placed on the supporting block 31, a lower die 32 is installed on the rubber block 33, and guide rods 34 having a guide hole formed therein are vertically installed between the supporting block 31 and the lower die 32.

Further, a rubber block 36 is present between an upper die 35 and a top plate 38, and guide rods 37 having guide holes formed therein are vertically installed between the upper die 35 and the top plate 38.

Semi-circular round holes 32a, 35a are formed between the lower die 32 and the upper die 35 with their sizes being coincided with an outer diameter size of the hollow shaft member 10. Inner wall surfaces of the round holes 32a, 35a have such hole diameters as size and precision not to bulge out the outer shape of the shaft member 10 in an outward direction as described below even if the shaft member 10 is pressed by the lower die 32 and the upper die 35 and a resistance force is generated inside under driving action of the pressing members 39a, 39b and 39c to be described later.

Thus, a pressing member 39a which is inserted into and passed through the upper die 35 and is protruded under pressing action of the top plate 38 is provided toward the center of the round hole 35b. In addition, pressing members 39b, 39c of which lower ends are supported by the supporting block 31 and of which upper ends are relatively protruded under a descending action of the lower die 32 are arranged in the lower die 32 toward the center of the round hole.

Then, it is an important matter that the aforesaid three or more pressing members 39a, 39b and 39c keep an equal angle to each other toward the center of the round holes 32a, 35a and concurrently they keep a size precision that they have the equal heights toward the fitting groove 21 of the end member 20.

Because, the coaxial degree of the end member in respect to the shaft member is determined under an action of the resistance force provided by the pressing members 39a, 39b and 39c as described below.

Figure 3:
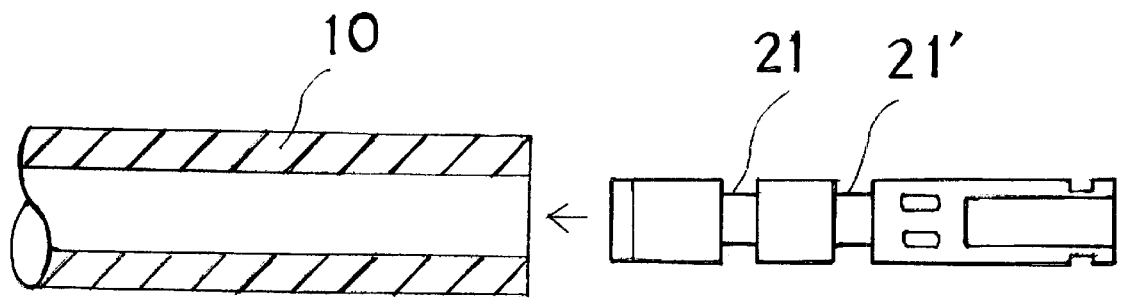
FIG. 3 is a sectional view with a part being broken away to show a shaft member and an end member of another embodiment of the present invention.
Figure 4:
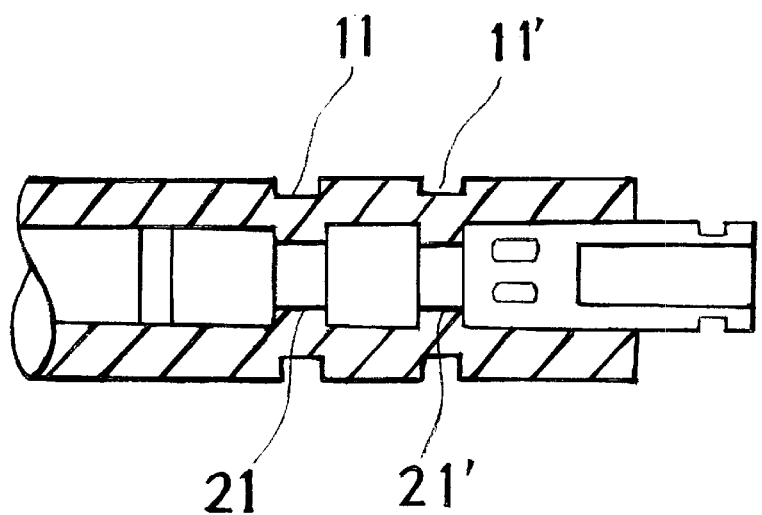
FIG. 4 is a sectional view with a part being broken away to show a state in which the end member is fitted to the shaft member in another embodiment of the present invention.

In the foregoing description, although it has been disclosed the embodiment in which only one row of the fitting groove 21 of the end member 20 is arranged, as shown in FIGS. 3 and 4 in order to obtain an increased effect, two or more rows of fitting grooves 21' may be formed at intervals at the end member 20 and in correspondence with this fitting groove arrangement, two or more rows of pressing members (not shown) may be also arranged at the molding machine. In this case, the shaft member 10 is plastically deformed toward the two or more rows of fitting grooves with the pressing forces of the two or more rows of pressing members to install the end member 20 into the shaft member 10 and is formed with pressing grooves 11, 11' at the outer circumferential surface.

Next, a method for installing the end member 20 of the present invention to the hollow shaft member 10 on the basis of the aforesaid condition will be described.

At first, the end member 20 molded while satisfying the aforesaid requirements is inserted into the hollow pipe-like shaft member 10 molded by the aforesaid method and the like.

This method is performed such that, for example, the end member 20 is inserted into the shaft member 10 by the insertion machine, subsequently it is inserted into the round holes 32a, 35a of the frame device 30, its extremity end is stopped by a stopper and the positions of the pressing members 39a, 39b and 39c from the stopper are coincided with the position of the fitting groove 21 of the end member 20.

Then, the top plate 38 above the upper die 35 is pressed by a press machine (not shown).

Figure 6A:
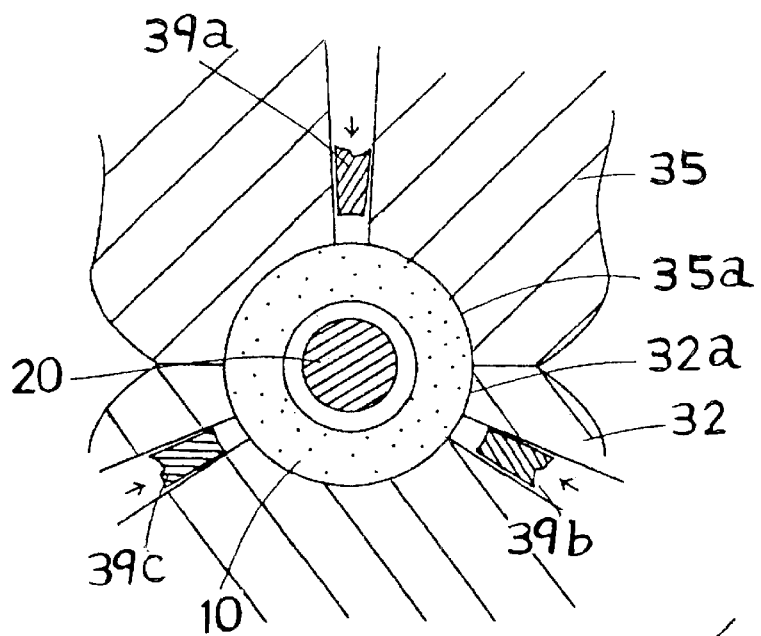

Then, the upper die 35 descends along the guide rods 37, approaches the lower die 32 and further as the pressing operation is continued, the rubber blocks 33, 36 are compressed, the pressing member 39a at the upper die 35 presses the upper side of the shaft member 10, and the pressing members 39b, 39c at the lower die 32 press the shaft member 10 from below under a state in which they may push it up from below, so that the outer wall of the shaft member 10 is pressed (refer to FIG. 6A).

Then, since the circular holes 32a, 35a formed by the lower die 32 and the upper die 35 are formed to have such a size as one in which the outer shape of the shaft member 10 is not bulged outwardly even if a resistance force is generated inside through driving of the pressing members 39a, 39b and 39c, the pressing force generated by the pressing members 39a, 39b and 39c causes the shaft member 10 to be positively deformed into the fitting groove 21 formed at the end member 20. This action is equally generated in three pressing members 39a, 39b and 39c.

Figure 6B:
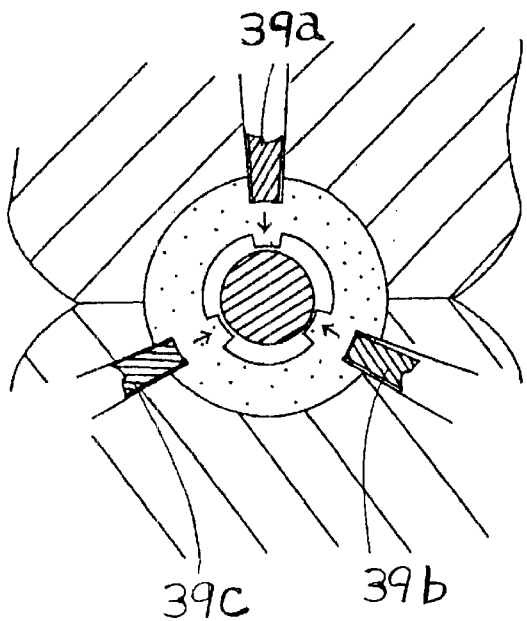

Then, a plastic deformation is generated in the shaft member 10 made of soft metal, severe sliding and transition are generated as an inner frictional heat occurs, the shaft member is gradually deformed along a space in the fitting groove 21 of the end member formed therein (refer to FIG. 6B), finally it reaches the bottom surface of the fitting groove 21. As the result, the pressing groove 11 is formed at the outer circumferential surface of the shaft member 10.

At this time, the pressing forces applied to the shaft member 10 caused by the pressing members 39a, 39b and 39c are applied in an equal force from at least three directions toward the center, and when the shaft member 10 reaches the bottom surface of the fitting groove 21 of the end member 20, a resistance force caused by repelling action is generated from the bottom surface.

The resistance forces are directed from the center of the end member to at least three deformation locations of the shaft member opposite to the pressing directions caused by the pressing members 39a, 39b and 39c. As a result, forces in three or more directions dispersed into equal arcuate angles $\theta1$, $\theta2$, and $\theta3$ influence to each other and are balanced.

Figure 6C:
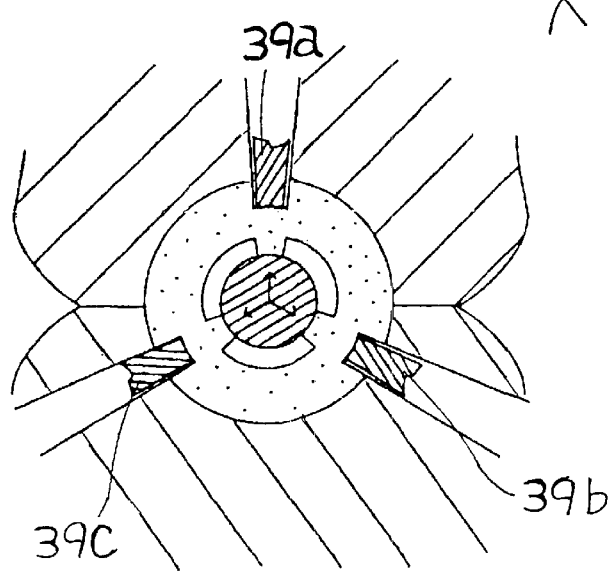
Figure 7:
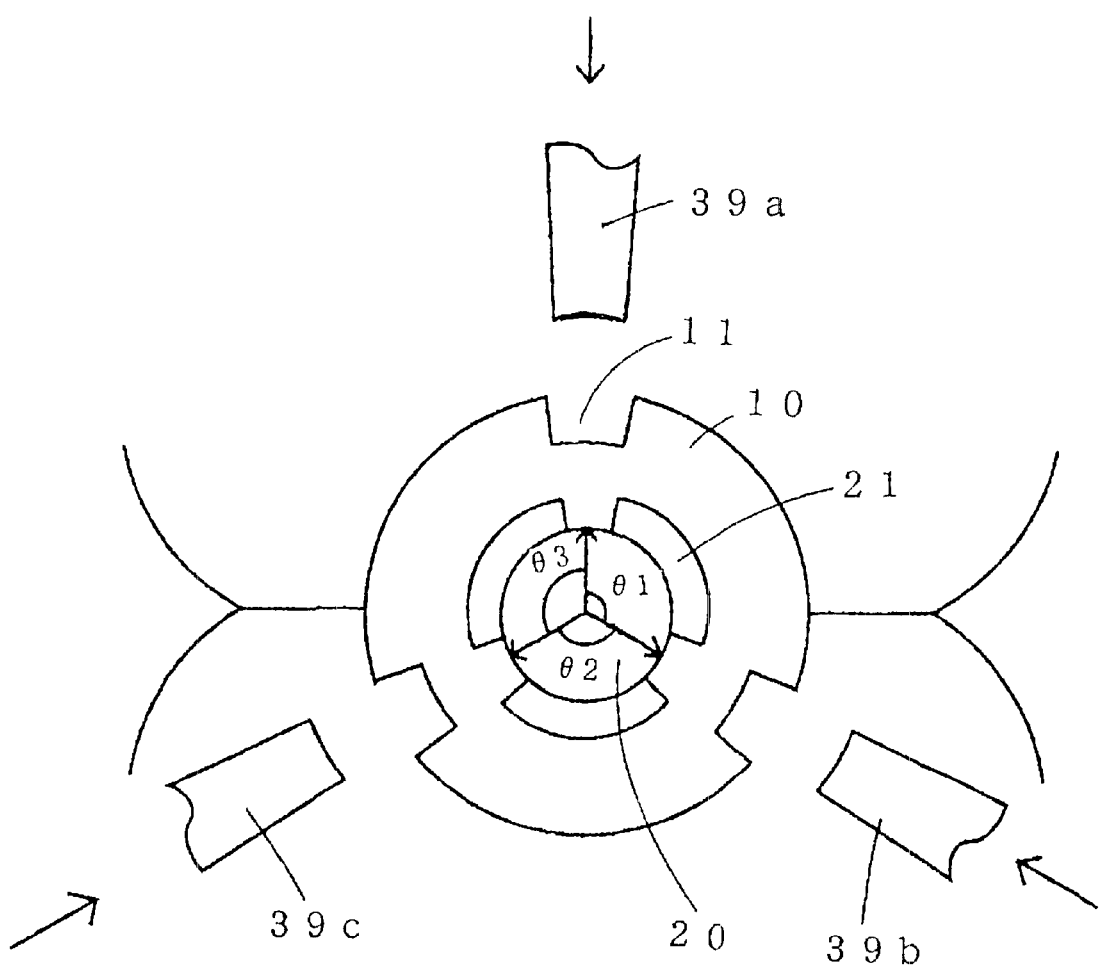
FIG. 7 is a schematic enlarged view for showing a state in which a pressing member presses against the shaft member of the present invention.

Accordingly, even if there are some irregular states in thickness of the shaft member, the irregular thickness states are made uniform by resistance forces directed in three or more directions to cause the end member to be fixed at the central position (refer to FIGS. 6C and 7).

Concurrently, an element for determining this pressing force is not the shaft member of soft metal at its outside part, but the inner wall surfaces of the round holes 32a, 35a of the upper die and the lower die made of hard metal. Concurrently, at an inner side it is also the bottom surface of the fitting groove 21 of the end member 20 made of hard metal.

Figure 5:
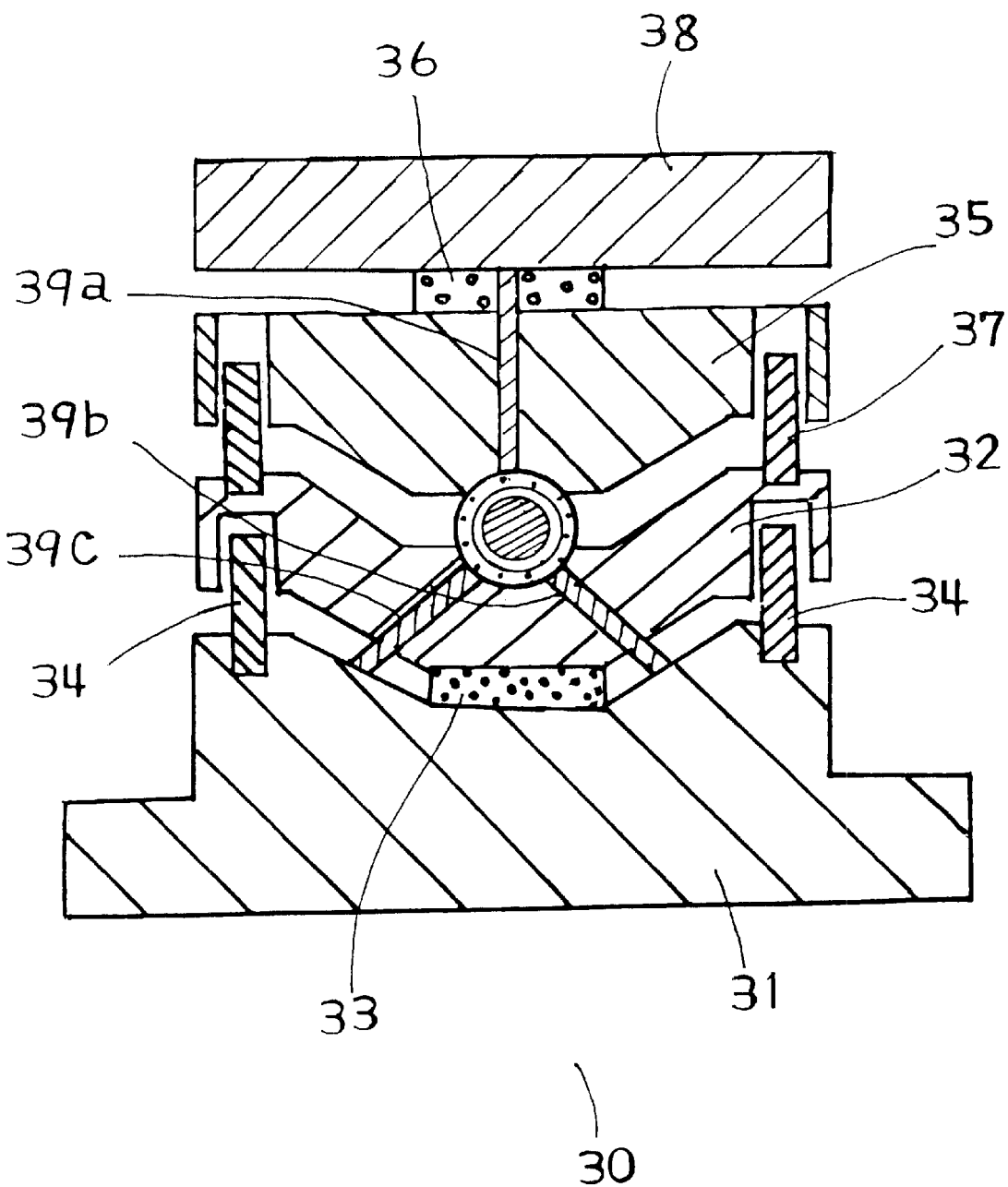
FIG. 5 is a sectional view for showing a framing machine used in a manufacturing stage of the shaft member of the present invention.

That is, as shown in FIG. 5, as the pressing force is generated at the pressing members 39a, 39b and 39c due to descending action of the top plate 38, the outside part of that force is fixed and supported by the inner walls of the round holes 32a, 35a formed by the lower die 32 and the upper die 35. Concurrently, the inside part of that force is fixed by the bottom surface of the fitting groove 21 of the end member 20 reached as a result of the plastic deformation.

Then, the round holes 32a, 35a and the fitting groove 21 are made of hard metal, their finishing precision is high, wherein the soft metal is plastic deformed by the pressing action, accompanied by the sliding in the structure and transition or the like.

Accordingly, a precision in size at the deformed location becomes quite high, resulting in that a precision of the coaxial degree of the end member fixed at the central position also becomes quite high.

Further, when the wedge-like protrusions 22 are formed at the end member 20, the shaft member is not loosely rotated around the end member even in the case that a high rotational force is added to the shaft member, resulting in that a so-called rotation preventive effect is realized.

Further, if both ends of the hollow shaft member are hermetically sealed when the end member is inserted into the hollow shaft member from a right side or a left side, air is expanded to apply a bad influence in the case that the rubber roller or the like is adhered to the shaft member under a high temperature heat. However, if the air releasing longitudinal groove is formed at the inner wall surface of the shaft member, the air is released in advance through this groove so that the bad influence can be prevented.

Then, the embodiment having two or more rows of the fitting grooves 21 formed in the end member 20 causes some superior effects to be attained as follows.

That is, as described above, it is a normal manufacturing method of the shaft member 10 that a soft metallic flat plate, for example, is applied between the forming rollers and gradually formed into a cylindrical shape, or is drawn through a die with a round hole lastly after passing both a extruding stage and a swaging stage. A reason why the last drawing operation with the die is applied consists in the fact that if an accuracy of the inner diameter of the shaft member is not kept at a height more than a certain specified value, a coaxial degree of high accuracy can not be attained.

However, in the case of the installing method of the present invention, a following run-out test has confirmed that even if the last drawing operation with the die is eliminated, a high coaxial degree can be attained and in particular, in the case that the two or more rows of fitting grooves 21 of the aforesaid end member are set, a high coaxial degree can be attained.

The run-out test in this case is defined as one in which a shaft member of a specimen to be tested is rotated on a table having a V-shaped groove formed therein and a run-out of the outer circumferential surface which is produced as the shaft member is rotated in the V-shape is measured by a laser scanning micrometer.

TABLE 1

Result of Test

| | Outer Diameter of Press fitted shaft (mm) | Inner Diameter of Pipe (mm) Thickness deviation Run-out | Press-fitting Margin at Location A (mm) Calculated Run-out | Run-out at Location A (mm) | Run-out at Location B (mm) | Press-fitting Margin at Location B (mm) Calculated Run-out | Inner Diameter of Pipe (mm) Thickness deviation Run-out | Outer Diameter of Press fitted shaft (mm) | Location A and Location B Anti Idle Running Torque (Pa) |
|---|---|---|---|---|---|---|---|---|---|
| 1 | 7.533 | 7.919 0.140 | 0.386 0.526 | 0.1386 | 0.1227 | 0.359 0.499 | 7.919 0.140 | 7.560 | 2.74 |
| 2 | 7.543 | 7.919 0.135 | 0.508 | | | 0.650 | 0.140 | | |
| 3 | 7.664 | 7.919 0.140 | 0.255 0.395 | 0.1794 | 0.2553 | 0.380 0.52 | 7.919 0.140 | 7.539 | 3.14 |
| 4 | 7.363 | 7.913 0.135 | 0.550 0.685 | 0.1295 | 0.1473 | 0.297 0.432 | 7.913 0.135 | 7.616 | 2.84 |
| 5 | 7.533 | 7.917 0.135 | 0.384 0.519 | 0.0755 | 0.0851 | 0.284 0.419 | 7.917 0.135 | 7.633 | 2.94 |
| 6 | 7.632 | 7.916 0.140 | 0.284 0.424 | 0.1689 | 0.0942 | 0.410 0.550 | 7.916 0.140 | 7.506 | 3.23 |
| 7 | 7.444 | 7.916 0.140 | 0.472 0.612 | 0.2735 | 0.0789 | 0.310 0.450 | 7.916 0.140 | 7.606 | 2.84 |
| 8 | 7.528 | 7.919 0.140 | 0.391 0.531 | 0.2867 | 0.1449 | 0.313 0.453 | 7.919 0.140 | 7.606 | 2.65 |

TABLE 1-continued

Result of Test

| | Differences between Outer Diameter of Press Fitted Shaft and Inner Diameter of Pipe | | Run-out of Outer Diameter of Pipe after Press Fitted | | | | | Location A and Location B Anti Idle Running Torque (Pa) |
|---|---|---|---|---|---|---|---|---|
| Outer Diameter of Press fitted shaft (mm) | Inner Diameter of Pipe (mm) Thickness deviation Run-out | Press-fitting Margin at Location A (mm) Calculated Run-out | Run-out at Location A (mm) | Run-out at Location B (mm) | Press-fitting Margin at Location B (mm) Calculated Run-out | Inner Diameter of Pipe (mm) Thickness deviation Run-out | Outer Diameter of Press fitted shaft (mm) | |
| 9  7.544 | 7.917 0.135 | 0.373 0.508 | 0.1452 | 0.1348 | 0.282 0.422 | 7.918 0.140 | 7.636 | 2.56 |
| 10 7.486 | 7.913 0.140 | 0.427 0.567 | 0.1996 | 0.272  | 0.322 0.457 | 7.914 0.135 | 7.592 | 2.74 |
| 11 7.390 | 7.913 0.140 | 0.523 0.663 | 0.2511 | 0.238  | 0.243 0.383 | 7.913 0.140 | 7.670 | 2.84 |
| 12 7.646 | 7.916 0.140 | 0.270 0.410 | 0.2365 | 0.2275 | 0.425 0.565 | 7.918 0.140 | 7.493 | 2.65 |
| 13 7.416 | 7.919 0.140 | 0.503 0.643 | 0.1728 | 0.2036 | 0.276 0.416 | 7.918 0.140 | 7.643 | 2.74 |

Location A: position between two rows of fitting grooves at left side of hollow shaft
Location B: position between two rows of fitting grooves at right side of hollow shaft As a result, it has been confirmed that an actual measured value of 0.173 mm in the installing method of the present invention improves a run-out by about 29% in respect to a maximum average value of 0.508 mm of addition of a run-out of inner and outer diameters of the shaft and a center run-out of the shaft at the time of its fixed state.

Further, it has been confirmed that the installing method of the present invention can attain an anti-torque of 2.55 Pa or more in respect to an average value of 0.369 mm of a difference between an inner diameter of the shaft and an outer diameter of a press fitted shaft.

Although the present invention has been described with reference to the preferred embodiments, it is apparent that the present invention is not limited to the aforesaid preferred embodiments, but various modifications can be attained without departing from its scope.

What is claimed is:

1. A method for attaching an end member (20) to the end of a hollow shaft member (10), comprising the steps of:
   (1) providing a cylindrical hollow shaft member (10) made of soft metal and having an inner wall surface formed at an inside diameter relative to an axis thereof and having an outer circumferential surface;
   (2) providing a cylindrical end member (20) made of hard metal and having an outer circumferential surface formed at an outside diameter about an axis thereof such that a substantially coaxial relationship occurs when the end member (20) is inserted into an end of the hollow shaft member (10), said end member (20) having a circumferential groove (21) formed therein at a predetermined distance from an end thereof, the groove (21) having a bottom surface substantially coaxial with the axis of the end member (20);
   (3) inserting the end member (20) into the end of the hollow shaft member (10) a sufficient distance so that the groove (21) is within the end of the hollow shaft member (10);
   (4) constraining the outer circumferential surface of the hollow shaft member (10) in a close-fitting circular die to prevent expansion thereof in an outward direction; and
   (5) pressing at least three circumferentially spaced portions of the hollow shaft member (10) into the groove (21) of the end member (20) using at least three respective rod-type pressing members (39a,39b,39c) while the outer circumferential surface thereof is constrained from expansion in the outward direction so that at least three circumferentially spaced portions of the hollow shaft member (10) are forcibly pressed into engagement with the bottom surface of the groove (21) to thereby attach the end member (20) to the end of the hollow shaft member (10), the three circumferentially spaced portions of the hollow shaft member forcibly pressed into engagement with the bottom surface of the groove (21) being circumferentially separated from one another.

2. The method for installing an end member (20) according to claim 1, further comprising at least one protrusion (22) formed on the outer circumferential surface of the end member (20) and extending outwardly therefrom.

3. The method for installing an end member (20) according to claim 1, wherein the inner wall surface of the shaft member (10) is formed with a groove therein extending in an axial direction.

4. The method for installing an end member (20) according to claim 2, wherein the inner wall surface of the shaft member (10) is formed with a groove therein extending in an axial direction.

5. A method for attaching an end member (20) to the end of a hollow shaft member (10), comprising the steps of:
   (1) providing a cylindrical hollow shaft member (10) made of soft metal and having an inner wall surface formed at an inside diameter about an axis thereof and having an outer circumferential surface;

(2) providing a cylindrical end member (20) made of hard metal and having an outer circumferential surface formed at an outside diameter about an axis thereof such that a substantially coaxial relationship occurs when the end member (20) is inserted into an end of the hollow shaft member (10), said end member (20) having a first circumferential groove (21) and at least a second circumferential groove (21') formed therein at predetermined respective distances from an end of the end member (20), the first groove (21) and the second groove (21') having respective bottom surfaces substantially coaxial with the axis of the end member (20);

(3) inserting the end member (20) into the end of the shaft member (10) a sufficient, distance so that the first groove (21) and the second groove (21') are within the end of the hollow shaft member (10);

(4) constraining the outer circumferential surface of the hollow shaft member (10) in a close fitting circular die to prevent expansion thereof in an outward direction; and (5) pressing at least three circumferentially spaced portions of the hollow shaft member (10) into the first groove (21) of the end member (20) using at least three respective rod-type pressing members (39a,39b,39c) and into the second groove (21') of the end member (20) using at least three other respective rod-type pressing members (39'a,39'b,39'c) so that at least three circumferentially spaced portions of the hollow shaft member (10) are forcibly pressed into engagement with the bottom surface of the first groove (21) and at least three other circumferentially spaced portions of the hollow shaft member (10) are forcibly pressed into engagement with the bottom surface of the second groove (21') to thereby attach the end member (20) to the end of the hollow shaft member (10), the three circumferentially spaced portions of the hollow shaft member forcibly pressed into engagement with the bottom surface of the first groove (21) being circumferentially separated from one another and the three circumferentially spaced portions of the hollow shaft member forcibly pressed into engagement with the bottom surface of the second groove (21') being circumferentially separated from one another.

\* \* \* \* \*